US010726709B2

(12) United States Patent
Coyne et al.

(10) Patent No.: US 10,726,709 B2
(45) Date of Patent: *Jul. 28, 2020

(54) SYSTEM AND METHOD FOR REPORTING THE EXISTENCE OF SENSORS BELONGING TO MULTIPLE ORGANIZATIONS

(71) Applicant: West Corporation, Omaha, NE (US)

(72) Inventors: Kevin Coyne, Superior, CO (US); William J. Eich, Wheaton, IL (US); John R. Martyn, Redmond, WA (US); Shiby Sugunan Parayil, Broomfield, CO (US)

(73) Assignee: West Corporation, Omaha, NE (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/943,836

(22) Filed: Apr. 3, 2018

(65) Prior Publication Data
US 2018/0225957 A1    Aug. 9, 2018

Related U.S. Application Data

(63) Continuation of application No. 14/966,514, filed on Dec. 11, 2015, now Pat. No. 9,934,675, which is a
(Continued)

(51) Int. Cl.
G08C 19/04        (2006.01)
G08C 19/10        (2006.01)
G08B 27/00        (2006.01)
G08B 23/00        (2006.01)
G06F 21/62        (2013.01)
G08B 25/01        (2006.01)
G08B 26/00        (2006.01)
H04N 7/18         (2006.01)
G08B 21/02        (2006.01)
G08B 25/14        (2006.01)
(Continued)

(52) U.S. Cl.
CPC ....... *G08B 27/003* (2013.01); *G06F 21/6218* (2013.01); *G08B 21/02* (2013.01); *G08B 23/00* (2013.01); *G08B 25/00* (2013.01); *G08B 25/009* (2013.01); *G08B 25/016* (2013.01); *G08B 25/14* (2013.01); *G08B 26/008* (2013.01); *G08B 27/005* (2013.01); *H04N 7/181* (2013.01); *G08B 21/10* (2013.01); *G08B 21/12* (2013.01)

(58) Field of Classification Search
CPC ...... G08B 27/003; G08B 21/02; G08B 23/00; G08B 25/00; G08B 25/009; G08B 25/016; G08B 25/14; G08B 26/008; G08B 27/005; G08B 21/10; G08B 21/12; G06F 21/6218; H04N 7/181
See application file for complete search history.

(56) References Cited

U.S. PATENT DOCUMENTS 4,974,601 A *  12/1990  Tranjan ............... A61B 5/02438
                                              600/493
5,091,780 A *   2/1992  Pomerleau ......... G06K 9/00771
                                              348/152
(Continued)

Primary Examiner — Quang Pham

(57) ABSTRACT

A system and method for reporting the existence of sensors belonging to multiple organizations that are proximally located to a requested location. The report includes a first list of sensors that are unauthorized and discoverable and a second list of sensors that are authorized.

18 Claims, 8 Drawing Sheets

Related U.S. Application Data continuation of application No. 14/285,147, filed on May 22, 2014, now Pat. No. 9,293,029.

(51) Int. Cl.
*G08B 25/00* (2006.01)
*G08B 21/10* (2006.01)
*G08B 21/12* (2006.01)

(56) References Cited

U.S. PATENT DOCUMENTS

| | | | | |
|---|---|---|---|---|
| 5,416,725 A * | 5/1995 | Pacheco | G08B 25/14 | 340/5.54 |
| 5,499,196 A * | 3/1996 | Pacheco | G08B 25/14 | 702/81 |
| 6,035,016 A * | 3/2000 | Moore | H04M 11/022 | 379/37 |
| 6,049,753 A * | 4/2000 | Nimura | G01C 21/3484 | 701/428 |
| 6,067,502 A * | 5/2000 | Hayashida | G01C 21/367 | 340/990 |
| 6,147,601 A * | 11/2000 | Sandelman | G06F 11/0748 | 340/506 |
| 6,160,477 A * | 12/2000 | Sandelman | G06F 11/0748 | 340/506 |
| 6,211,782 B1 * | 4/2001 | Sandelman | G06F 11/0748 | 340/506 |
| 6,380,851 B1 * | 4/2002 | Gilbert | G07F 17/24 | 340/3.1 |
| 6,400,265 B1 * | 6/2002 | Saylor | G08B 13/19602 | 340/506 |
| 6,633,240 B1 * | 10/2003 | Sweatt | G08B 25/10 | 340/539.26 |
| 6,661,340 B1 * | 12/2003 | Saylor | G08B 25/016 | 340/3.3 |
| 6,970,077 B2 * | 11/2005 | Johnson | G08B 17/00 | 340/286.11 |
| 6,989,745 B1 * | 1/2006 | Milinusic | G08B 13/19604 | 340/501 |
| 7,161,481 B2 * | 1/2007 | Turner | G06Q 10/10 | 340/506 |
| 7,248,161 B2 * | 7/2007 | Spoltore | G08B 25/008 | 340/12.5 |
| 7,259,656 B1 * | 8/2007 | Wright | G01C 21/20 | 340/286.14 |
| 7,859,571 B1 * | 12/2010 | Brown | G08B 13/19645 | 348/211.3 |
| 7,961,089 B2 * | 6/2011 | McSheffrey | A61N 1/39 | 340/286.05 |
| 8,365,278 B1 * | 1/2013 | Njemanze | H04L 63/1416 | 726/22 |
| 8,369,487 B2 * | 2/2013 | Alexander Elliot | H04L 12/66 | 379/40 |
| 8,369,967 B2 * | 2/2013 | Hoffberg | G05B 15/02 | 700/80 |
| 8,375,118 B2 * | 2/2013 | Hao | G05B 15/02 | 709/223 |
| 8,384,539 B2 * | 2/2013 | Denny | G06F 17/00 | 340/521 |
| 8,447,265 B2 * | 5/2013 | Flippo | G01S 19/34 | 455/404.2 |
| 8,473,619 B2 * | 6/2013 | Baum | H04L 67/025 | 709/227 |
| 8,478,844 B2 * | 7/2013 | Baum | H04L 12/282 | 709/220 |
| 8,612,591 B2 * | 12/2013 | Dawes | G08B 25/08 | 709/225 |
| 8,635,350 B2 * | 1/2014 | Gutt | H04L 29/12028 | 370/401 |
| 8,693,610 B2 * | 4/2014 | Hess | G21C 9/00 | 376/277 |
| 8,698,614 B1 * | 4/2014 | Trundle | G08B 25/006 | 340/507 |
| 8,705,704 B2 * | 4/2014 | Smith | H04M 11/04 | 379/37 |
| 8,705,716 B2 * | 4/2014 | Gregory | H04M 3/38 | 379/142.01 |
| 8,713,132 B2 * | 4/2014 | Baum | H04L 12/2809 | 709/218 |
| 8,779,921 B1 * | 7/2014 | Curtiss | G08B 25/009 | 340/506 |
| 2003/0202101 A1 * | 10/2003 | Monroe | G08B 13/19689 | 348/156 |
| 2005/0079880 A1 * | 4/2005 | Donner | H04Q 9/00 | 455/466 |
| 2005/0128068 A1 * | 6/2005 | Winick | B60R 25/1004 | 340/517 |
| 2005/0192742 A1 * | 9/2005 | Okochi | G01C 21/3484 | 701/424 |
| 2007/0139182 A1 * | 6/2007 | O'Connor | G08B 27/006 | 340/521 |
| 2007/0139183 A1 * | 6/2007 | Kates | H04Q 9/00 | 340/521 |
| 2008/0109099 A1 * | 5/2008 | Moshier | G06Q 10/06 | 700/103 |
| 2008/0304094 A1 * | 12/2008 | Teshima | G03G 15/5016 | 358/1.14 |
| 2009/0010197 A1 * | 1/2009 | Chao | H04H 20/61 | 370/312 |
| 2009/0261943 A1 * | 10/2009 | Jana | G08B 25/012 | 340/3.1 |
| 2009/0264150 A1 * | 10/2009 | Andreasson | G01D 21/00 | 455/556.1 |
| 2010/0004816 A1 * | 1/2010 | Bauchot | G06Q 10/00 | 701/33.4 |
| 2010/0088443 A1 * | 4/2010 | Riocreux | G06F 13/362 | 710/244 |
| 2010/0161630 A1 * | 6/2010 | Moriwaki | H04L 67/12 | 707/758 |
| 2010/0176962 A1 * | 7/2010 | Yossef | G01R 31/68 | 340/815.45 |
| 2010/0188197 A1 * | 7/2010 | Ackley | H04Q 9/00 | 340/10.1 |
| 2010/0241744 A1 * | 9/2010 | Fujiwara | H04L 29/12028 | 709/224 |
| 2010/0241862 A1 * | 9/2010 | Garcia Morchon | H04L 63/061 | 713/171 |
| 2010/0279649 A1 * | 11/2010 | Thomas | G06Q 10/10 | 455/404.2 |
| 2010/0299118 A1 * | 11/2010 | Sharma | G05B 23/024 | 703/2 |
| 2011/0231451 A1 * | 9/2011 | Hamamura | G06F 16/23 | 707/802 |
| 2011/0274251 A1 * | 11/2011 | Omernick | G01T 7/00 | 378/98.8 |
| 2012/0086573 A1 * | 4/2012 | Bischoff | G08B 25/016 | 340/573.1 |
| 2012/0092158 A1 * | 4/2012 | Kumbhar | G08B 15/00 | 340/539.13 |
| 2012/0304294 A1 * | 11/2012 | Fujiwara | H04L 29/12028 | 726/22 |
| 2012/0310598 A1 * | 12/2012 | Gregory | G01D 9/005 | 702/187 |
| 2013/0100268 A1 * | 4/2013 | Mihailidis | G08B 21/02 | 348/77 |
| 2013/0116922 A1 * | 5/2013 | Cai | G01C 21/206 | 701/515 |
| 2013/0157612 A1 * | 6/2013 | Cordero | H04W 4/90 | 455/404.2 |
| 2013/0218456 A1 * | 8/2013 | Zelek | G01C 21/3652 | 701/412 |
| 2013/0271286 A1 * | 10/2013 | Quan | G08B 5/00 | 340/691.6 |
| 2013/0276144 A1 * | 10/2013 | Hansen | G06F 21/60 | 726/29 |
| 2014/0100893 A1 * | 4/2014 | Zizzi | G06F 21/34 | 705/4 |

(56) References Cited

U.S. PATENT DOCUMENTS

| | | | | |
|---|---|---|---|---|
| 2014/0128994 A1* | 5/2014 | Hallman | ............. | H04L 12/2809 |
| | | | | 700/12 |
| 2014/0184238 A1* | 7/2014 | Yossef | .................... | H04L 43/00 |
| | | | | 324/538 |
| 2014/0218514 A1* | 8/2014 | Dziadosz | ......... | G08B 13/19654 |
| | | | | 348/143 |
| 2014/0218518 A1* | 8/2014 | Oliver | ................ | G08B 13/1672 |
| | | | | 348/143 |
| 2014/0266764 A1* | 9/2014 | Henrie | ..................... | G08B 5/38 |
| | | | | 340/691.1 |
| 2014/0309870 A1* | 10/2014 | Ricci | ....................... | G01S 19/42 |
| | | | | 701/36 |
| 2014/0313044 A1* | 10/2014 | Thompson | ............. | G08B 21/10 |
| | | | | 340/686.6 |
| 2015/0002292 A1* | 1/2015 | Cavalcanti | ............. | G08B 21/02 |
| | | | | 340/539.12 |
| 2015/0293796 A1* | 10/2015 | Wang | ...................... | G06F 30/34 |
| | | | | 719/318 |

* cited by examiner

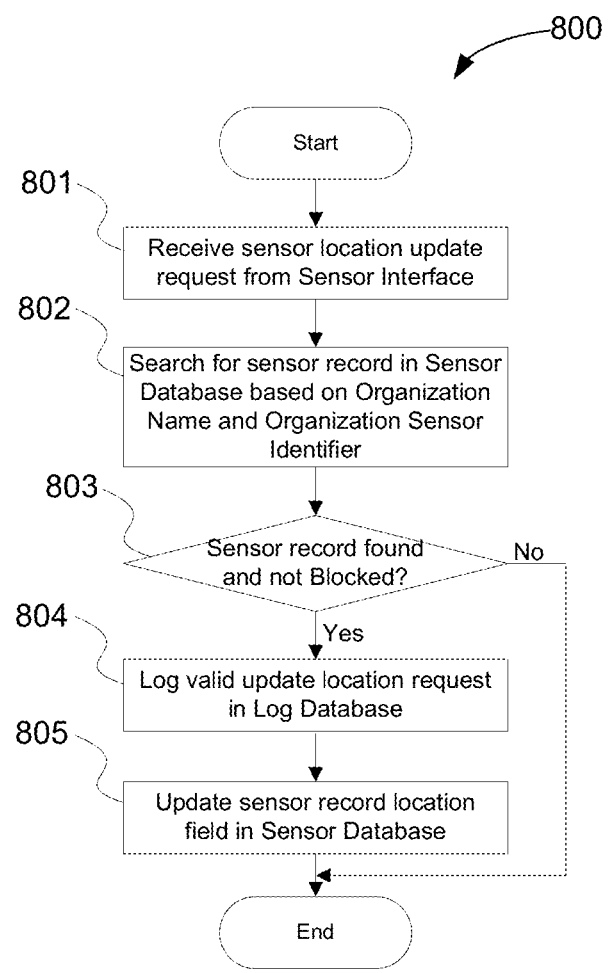

SYSTEM AND METHOD FOR REPORTING THE EXISTENCE OF SENSORS BELONGING TO MULTIPLE ORGANIZATIONS

CROSS-REFERENCE TO RELATED APPLICATIONS

This continuation application claims the benefit and priority of U.S. Non-Provisional patent application Ser. No. 14/966,514 filed Dec. 11, 2015, which is a continuation from and claims priority from U.S. patent application Ser. No. 14/285,147 filed May 22, 2014, now issued U.S. Pat. No. 9,293,029.

FIELD OF THE INVENTION

The present invention is directed to a system and method for reporting the existence of sensors belonging to multiple organizations.

BACKGROUND OF THE INVENTION

Sensors are used to detect or measure stimuli such as air pressure, temperature, humidity, moisture, mechanical pressure, optical, acoustic waves, motion, presence of chemicals or gasses, presence of biological matter, presence of metal, electromagnetic radiation, biometric parameters, visual pattern recognition, nuclear radiation and visual streams. Sensor information is used by monitoring and control systems to support a wide range of functions, such as adjusting environmental conditions (thermostat), fire detection and possibly triggering a fire suppression system (fire alarm), detecting and reporting intrusions and property theft (burglar alarm), maximizing energy efficiency (room occupancy detector) and identifying hazards including gunshots and explosions.

There are literally billions of sensors in use within the US, across organizations that include government agencies, businesses and consumers, with each organization owning and maintaining its sensors independently due to significant safety, security and privacy concerns. This "silo effect" is a barrier to interconnecting and sharing sensor information across multiple organizations. Indeed, these concerns not only prevent sharing sensor information across multiple organizations, they also prevent sharing even the existence of sensors across multiple organizations.

One attempt for overcoming the "silo effect" was the creation of the Unites States Department of Homeland Security (DHS) whose founding principle and highest priority is protecting the American people from terrorist threats. DHS combined 22 different federal departments and agencies into a unified, integrated cabinet agency when it was established in 2002. Creation of a single government department is one approach for solving the organizational problem of not having integrated monitoring and analysis of chemical, biological, metals, radiation, nuclear, and explosive (CBMRNE) materials.

A second attempt of trying to overcome the organizational "silo effect" was the creation of New York's Lower Manhattan Security Initiative which monitors 4,000 security cameras and license plate readers south of Canal Street. The project uses feeds from both private and public security cameras, which are all monitored 24 hours a day by the New York police department. Using face and object-detection technology, the police can track cars and people moving through 1.7 square miles in lower Manhattan and even detect unattended packages. The $150 million initiative also includes a number of radiation detectors and other security measures.

While creating a single government department such as DHS made possible integrated monitoring of CBMRNE materials and creating the Lower Manhattan Security Initiative made possible integrated monitoring of terrorist threats in lower Manhattan, these approaches for integrated monitoring to detect an emergency condition are not practical on a widespread basis.

By not sharing sensor information across organizations, timely and appropriate response to an emergency condition is greatly compromised. For example, a chemical attack detected by a DHS sensor could be much more meaningful if it were combined with video sensor information from nearby businesses. Similarly, an explosion detected by a DHS sensor could be combined with power outage sensor information to automatically show the impact of the explosion. On a smaller scale, local police response to a residential silent alarm being triggered could be more effective if the police had access to neighboring security cameras.

A real world example of this problem can be understood from the Boston Marathon bombings on Apr. 15, 2013, where a series of two attacks targeting spectators and attendees of the city's annual marathon took place. Two bombs exploded at approximately 2:49 pm EDT, killing three people and injuring an estimated 264 others. To identify the suspects, authorities had to sift through a mountain of footage from government surveillance cameras, private security cameras and imagery shot by bystanders on smartphones. It took the FBI three days to release blurry shots of the two suspects, taken by a department store's cameras. In those three days, the suspects killed a police officer and hijacked a civilian. Lacking information regarding the extent of the attack, the Federal Aviation Administration restricted airspace over Boston and issued a temporary ground stop for Boston's Logan International Airport. In addition, some Massachusetts Bay Transportation Authority service was halted and several cities in Massachusetts and other states put their police forces on alert. Despite this massive over-reaction to the bombing attack that virtually shut down the city of Boston, FBI Director Robert Mueller commended the efforts of law enforcement, intelligence, and public safety agencies on their handling of the bomb attack.

There is a need for a system and method that: (1) monitors sensors belonging to multiple organizations; (2) detects an emergency condition based on sensor information; (3) associates a location with the detected emergency condition; (4) sends an emergency condition report to an authorized recipient where the report includes sensor information for sensors that are proximally located to the detected emergency condition; and (5) reports the existence of sensors belonging to multiple organizations.

SUMMARY OF THE INVENTION

In accordance with one aspect of this invention, disclosed is a method for reporting the existence of sensors belonging to multiple organizations to a recipient that are proximally located to a requested location. The method includes: (a) receiving a request from the recipient, where the request includes an authorization level, a location and a proximity; (b) searching a memory for sensors that are proximally located to the requested location; (c) creating a first list of sensors that are unauthorized and discoverable, according to the following steps: (i) determining a sensor authorization level; (ii) comparing the sensor authorization level to the recipient authorization level; and (iii) adding the sensor to the first list of sensors if the following conditions are true: (1) the recipient authorization level is below the sensor authorization level and, (2) the sensor Unauthorized Recipient Discovery field is set to True; (d) creating a second list of sensors that are authorized, according to the following steps: (i) determining a sensor authorization level; (ii) comparing the sensor authorization level to the recipient authorization level; and (iii) adding the sensor to the second list of sensors if the recipient authorization level is at least the same as the sensor authorization level; and (e) sending a report to the recipient containing the first list of sensors and the second list of sensors.

In accordance with another aspect of this invention, disclosed is a system for reporting the existence of sensors belonging to multiple organizations to a recipient that are proximally located to a requested location. The system includes a memory comprising instructions and a processor in communication with the memory. The processor in the system performs operations including: (a) receiving a request from the recipient, where the request includes an authorization level, a location and a proximity; (b) searching a memory for sensors that are proximally located to the requested location; (c) creating a first list of sensors that are unauthorized and discoverable, according to the following steps: (i) determining a sensor authorization level; (ii) comparing the sensor authorization level to the recipient authorization level; and (iii) adding the sensor to the first list of sensors if the following conditions are true: (1) the recipient authorization level is below the sensor authorization level and, (2) the sensor Unauthorized Recipient Discovery field is set to True; (d) creating a second list of sensors that are authorized, according to the following steps: (i) determining a sensor authorization level; (ii) comparing the sensor authorization level to the recipient authorization level; and (iii) adding the sensor to the second list of sensors if the recipient authorization level is at least the same as the sensor authorization level; and (e) sending a report to the recipient containing the first list of sensors and the second list of sensors.

BRIEF DESCRIPTION OF THE DRAWINGS

The accompanying drawings, which are incorporated into and form a part of the specification, illustrate a preferred embodiment of the present invention and, together with the description, serve to explain the principles of the invention. In the drawings:

FIG. 8 contains flowchart 800 that illustrates the steps for dynamically updating a sensor's location.

DETAILED DESCRIPTION

The computer-based apparatus and method of the present invention comprise hardware components and associated software, providing detection and reporting of emergency conditions. The invention stores sensor configuration data related to sensors belonging to multiple organizations. For detecting an emergency condition, sensor information is received and then analyzed by the invention using decision rules contained in a rules database. Sensors provide the following categories of information:

1) indication of an alarm condition, such as audible detection of a gunshot;
2) measurement data, such as water flow rate through a fire sprinkler system;
3) a stream of data, such as from a video camera; and
4) a sensor health status indication by sending a periodic "I'm alive" message which is referred to herein as a heartbeat message.

When an emergency condition is detected or has changed status, the invention uses recipient rules contained in a rules database to notify recipients. The notification to the recipient includes information from sensors that are proximally located to the detected emergency condition.

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended to be synonymous with each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
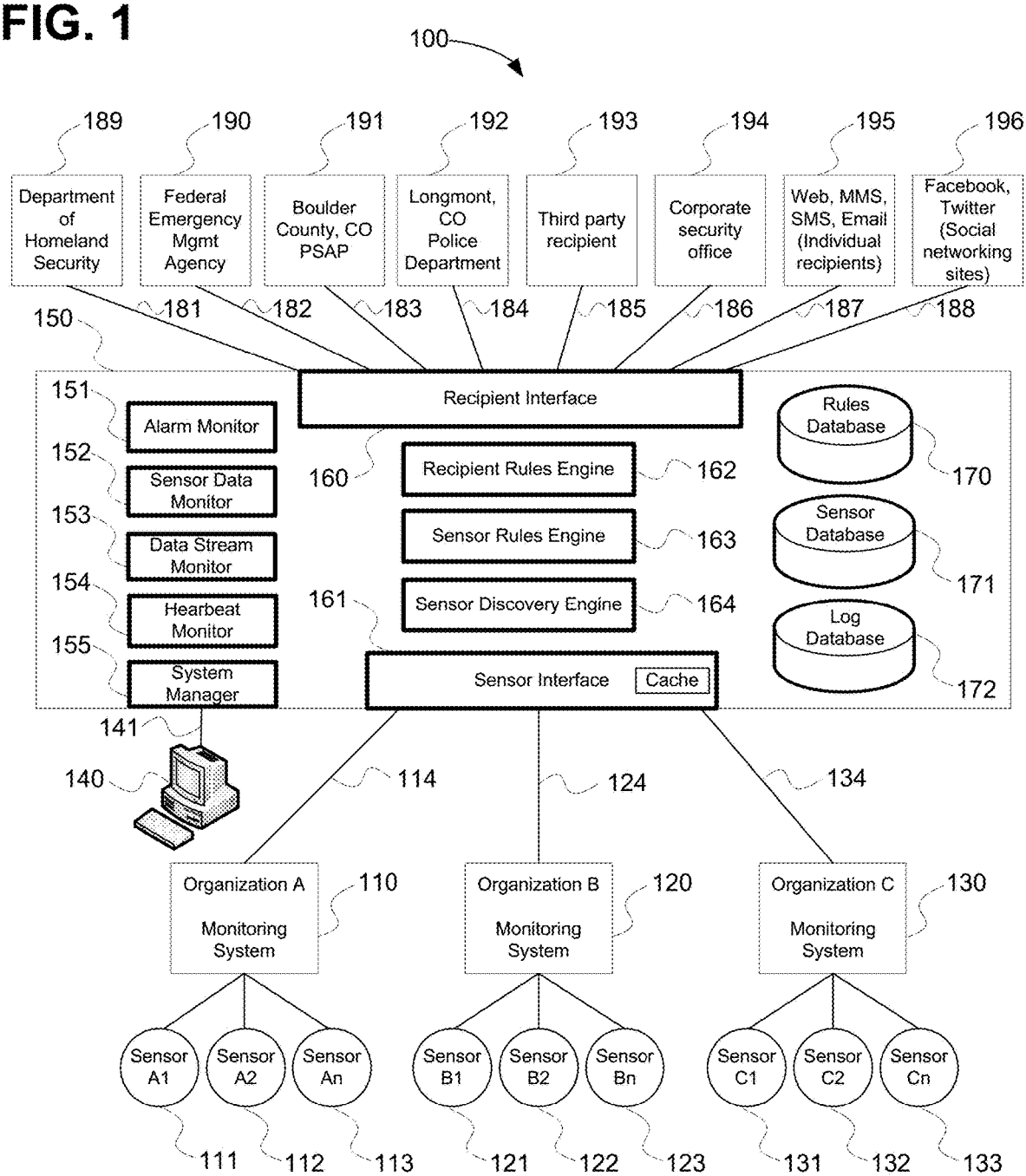
FIG. 1 is a schematic illustrating the Emergency Condition Detection and Reporting System, and is shown in an exemplary configuration connected to three organizations, eight report recipients and one system administrator.

As shown in FIG. 1, diagram 100 illustrates the Emergency Condition Detection and Reporting System 150 in an exemplary configuration coupled to three Organizations 110, 120 and 130, and coupled to eight report recipients 189-196. Coupled to Organization A 110 are sensors A1-An 111-113, coupled to Organization B 120 are sensors B1-Bn 121-123, and coupled to Organization C are sensors C1-Cn 131-133. Although diagram 100 depicts three organization with three sensors per organization and eight report recipients, it should be understood by one skilled in the art that the Emergency Condition Detection and Reporting System 150 is not constrained by the number of sensors, organizations or report recipients.

Sensor information is received from sensors 111-113, 121-123 and 131-133 belonging to Organizations 110, 120 and 130, respectively. Sensors 111-113, 121-123 and 131-133 are coupled to the Emergency Condition Detection and Reporting System 150 over interfaces 114, 124 and 134, respectively, and communicate to the Sensor Interface 161 using at least one of the following protocols: IP, TCP, UDP, SCTP, HTTP, HTTPS, SIP, RTP, RTSP and MQTT. These protocols are IETF and OASIS standard protocols and are understood by those skilled in the art without providing specific protocol details.

The Sensor Interface 161 temporarily saves the received sensor information in a memory cache for a period of time that is configurable by a system administrator ranging from five minutes to 24 hours. It should be understood for one skilled in the art that sensor information may be cached for a period of time longer than 24 hours. In one alternative embodiment, sensor information is cached in the Alarm Monitor 151, Sensor Data Monitor 152, Data Stream Monitor 153 or Heartbeat Monitor 154, either in conjunction with or as a replacement to the Sensor Interface 161 cache. In a second alternative embodiment, sensor information is retrieved from the sensor. Depending on a recipient's authorization level, sensor information for sensors proximally located to a detected emergency is sent to the recipient, either by using cached information or by sending a query to the sensor for via the Sensor Interface 161.

The purpose for caching sensor information and retrieving sensor information can be seen in the following scenarios. Consider a scenario where a gunshot emergency is detected. In this scenario, an authorized recipient receives cached data streams from video cameras that are within a proximate distance. In a second scenario, an authorized recipient receives an alarm indication from a radiation detector. In this scenario, an authorized recipient queries the radiation detector for historical information to determine if a detected radiation level increased gradually over a period of weeks or if the detected radiation level had a sudden onset. This invention provides authorized recipients with contextual information using sensors belonging to multiple organizations that are proximally located to a detected emergency condition.

Within the Emergency Condition Detection System and Reporting 150, there are several types of processing modules: four Monitors 151-154, a System Manager 155, two Interfaces 160-161, three Logic Engines 162-164, and three Databases 170-172. Processing modules in the Emergency Condition Detection and Reporting System 150 are coupled to each other (coupling not shown in FIG. 1).

Monitors 151-154 are responsible for monitoring the different categories of sensor information received via Sensor Interface 161.

System Manager 155 provides a command line interface and a web interface for managing the Emergency Condition Detection and Reporting System 150 for a system administrator 140 via interface 141. Using the System Manager 155, a system administrator 140 via interface 141 manages sensor records, sensor rules, recipient rules, log records and system settings Recipient Interface 160 pushes emergency condition reports, sensor information and sensor lists to a recipient and receives pull requests from a recipient for sensor information and sensor lists. Recipient Interface 160 maintains the coupling to recipients 189-196 via interfaces 181-188 and uses at least one of the following protocols: IP, TCP, UDP, SCTP, HTTP, HTTPS, SIP, XML, CAP, RTP, RTSP, SMTP, SMPP, MM4 or MM7. In an alternative embodiment, other similar protocols that are known to one skilled in the art such as FTP, POP3, IMAP and XMPP are used between Recipient Interface 160 and recipients 189-196. These protocols are IETF, OASIS and 3GPP standard protocols and are understood by those skilled in the art without providing specific protocol details.

Sensor Database 171 stores sensor configuration data that is either automatically learned using the Sensor Discovery Engine 164 or is entered through the System Manager 155 by system administrator 140 via interface 141. In the preferred embodiment, a system administrator manages sensor records using a web-based interface. In alternative embodiments, sensor records are managed through a database record import/export function and via a command line interface. An exemplary Sensor Database record for a video camera belonging to a business organization is shown in the following table:

| Field Name | Value |
| --- | --- |
| Create Timestamp | 2014-03-25 08:44:21 GMT |
| Organization Name | Intrado Inc. |
| Organization Contact | Security Department, (720) 555-1212 |
| Organization Sensor Identifier | Cam_front_parking_lot |
| Federal Authorization Level | 3 |
| State Authorization Level | 2 |
| Local Authorization Level | 1 |
| Unauthorized Recipient Discovery | True |
| Authorized Recipient Auto Send | False |
| Sensor Technology | Camera |
| Sensor Street Address | 1601 Dry Creek Drive, Longmont, CO 80502 |
| Sensor Latitude | 40.2383333 |
| Sensor Longitude | −105.1522222 |
| Sensor Location Description | Roof, NE Corner, Parking Lot View |
| Sensor Heartbeat Interval | 60 seconds |
| Sensor Heartbeat Importance | Low |
| Sensor Current Data Query | |
| Sensor Historical Data Query | |
| Sensor Data Stream | rtsp://192.168.1.254:5555?stream=1 |
| Sensor Data Stream Importance | Low |
| Sensor Data Normal - Low Limit | |
| Sensor Data Normal - High Limit | |
| Sensor Data - Averaging Interval | |
| Sensor Abnormal Data Importance | Low |
| Sensor Alarm Indication Importance | Low |
| Monitor Mode | Active |
| Verifier Username | Ssmith |
| Verifier Timestamp | 2014-03-27 11:29:08 GMT |

An exemplary Sensor Database record for a radiation detector belonging to a local government agency is shown in the following table:

| Field Name | Value |
| --- | --- |
| Create Timestamp | 2014-03-25 08:44:21 GMT |
| Organization Name | Port of Seattle |
| Organization Contact | Security Department, (206) 555-1212 |
| Organization Sensor Identifier | Radiation_detector_terminal_a |
| Federal Authorization Level | 3 |
| State Authorization Level | 3 |
| Local Authorization Level | 0 |
| Unauthorized Recipient Discovery | False |
| Authorized Recipient Auto Send | True |
| Sensor Latitude | 47.4490013 |
| Sensor Longitude | −122.3089981 |
| Sensor Location Description | Seattle-Tacoma International Airport, roof closet C123 |
| Sensor Heartbeat Interval | 60 seconds |
| Sensor Heartbeat Importance | Medium |
| Sensor Current Data Query | https://192.168.1.55:9999?time=now |
| Sensor Historical Data Query | https://192.168.1.55:9999?time=$YY-$MM-$DD $HH:$MM:$SS] |
| Sensor Data Stream | |
| Sensor Data Stream Importance | High |
| Sensor Data Normal - Low Limit | 3 |
| Sensor Data Normal - High Limit | 100 |
| Sensor Data - Averaging Interval | 3600 seconds |
| Sensor Abnormal Data Importance | High |

-continued

| Field Name | Value |
|---|---|
| Sensor Alarm Indication Importance | High |
| Monitor Mode | Active |
| Verifier Username | Ssmith |
| Verifier Timestamp | 2014-03-27 11:29:08 GMT |

For a stationary sensor, Sensor Latitude and Sensor Longitude is either configured statically or updated dynamically in the Sensor Database 171. If a sensor is not stationary, Sensor Latitude and Sensor Longitude are updated dynamically when the sensor's location changes via the Sensor Interface 161. The processing steps for dynamically updating a sensor's location is depicted in FIG. 8 flowchart 800.

Turning to FIG. 8, flowchart 800 shows the steps for receiving and processing a sensor location update request. At step 801, a sensor location update request is received from the Sensor Interface 161 in FIG. 1. Processing continues to step 802, where the Sensor Interface searches for an existing record in the Sensor Database 171 in FIG. 1 using the parsed Organization Name and Organization Sensor Identifier. After step 802, processing continues to step 803 to determine whether a matching sensor record is found with Monitor Mode field not set to Blocked and a different location, with processing either continuing to step 804 if a matching sensor record is found or ending if no matching sensor record is found. If a matching sensor record is found, at step 804 a log entry is added to the Log Database 172 in FIG. 1 to indicate that the sensor location has been updated. Processing continues to step 805 where the sensor record is updated with the new location.

Updating sensor location dynamically is a novel feature of this invention. In the preferred embodiment, by using this feature an authorized recipient who receives an emergency condition report may initiate a drone launch to provide video surveillance of the geographic area where the emergency condition was detected. In real-time, this invention receives sensor location update requests and can share the video data stream with authorized recipients. Similarly, a pan/tilt/zoom camera may be repositioned by a recipient so that it is pointing in the direction of a detected emergency condition with its new location/direction being updated dynamically. In an alternative embodiment, the Sensor Rules Engine 163 in FIG. 1 is used to command repositioning of a sensor.

Returning to FIG. 1, sensor records in the Sensor Database 171 are periodically scanned by the Monitors 151-154 and by the System Manager 155. The scanning interval is configured by the system administrator 140 via interface 141, and ranges from ten seconds to one hour. There reasons for scanning sensor records in the Sensor Database 171 are as follows:

Monitors 151-154 initiate processing of sensor information when a sensor record scan indicates a new sensor record has either been added or updated except for dynamic location changes, the Monitor Mode is set to Active and the sensor has been verified. Similarly, the Monitors 151-154 stop monitoring a sensor if its sensor record has been deleted, becomes unverified or has a Monitor Mode that is not set to Active or Test.

System Manager 155 sends an e-mail message to the system administrator 140 via interface 141 to request verification for any unverified sensor records when a sensor record scan indicates a new sensor record has either been added or updated. Note that system administrator 140 does not need to wait for a scan cycle—the system administrator 140 is able to query the Sensor Database 171 via interface 141 to search for any sensor records that need to be verified. The sensor record verification procedure provides operational security and integrity to the Emergency Condition Detection System and Reporting 150 by requiring the system administrator 140 to verify sensor configuration data.

An organization that elects to share its sensors with the Emergency Condition Detection and Reporting System 150 defines one or more authorization levels for each of their sensors. The sensor authorization levels are stored in the sensor record and are used by the Emergency Condition Detection and Reporting System 150 to prevent sharing sensor information with recipients whose authorization level is below the sensor's authorization level.

Each sensor record in Sensor Database 171 has three categories of authorization levels: (1) Federal; (2) State; and (3) Local. The following table provides an exemplary mapping of recipients to categories and authorization levels:

| Category | Level | Recipients |
|---|---|---|
| Federal | 1 | President, House of Representatives majority vote, Senate majority vote, US Supreme Court |
| Federal | 2 | DHS, FEMA, ATFE Bureau, CIA, FBI, NSA with approved court order |
| Federal | 3 | DHS, FEMA |
| State | 1 | Governor, State Supreme Court |
| State | 2 | State Legislature |
| State | 3 | State Police |
| Local | 1 | Mayor |
| Local | 2 | PSAP, Police with court order |
| Local | 3 | Police, Fire |
| Local | 4 | Risk Management, Public Health |

Although the exemplary authorization table shown above lists three authorization categories and no more than four levels in a category, it should be understood by one skilled in the art that the Emergency Condition Detection and Reporting System 150 is not constrained by the number authorization categories and levels. It is reasonable to have a category defined for commercial interests, such as an alarm monitoring business or for a video analytics company. This flexible authorization structure is a novel way to address an organization's privacy and security. In considering the Boston Marathon example, had video sensors belonging to the businesses surrounding the bombing attack been shared with authorization Federal-3 or Local-3, then the DHS or Boston Police Department would have immediate access to the current camera feeds and have access to historic video.

To provide an increased level of organization privacy, an organization also defines for each of their sensors whether an unauthorized recipient can have awareness of the existence of a sensor using the Unauthorized Recipient Discovery field in the sensor record. If the Unauthorized Recipient Discovery field in a sensor record is set to True, an unauthorized recipient has access to the sensor record, but does not have access to the sensor information. If the Unauthorized Recipient Discovery field is set to False, the existence of an organization's sensor is invisible to unauthorized recipients. This flexibility provides a novel approach to address an organization's privacy concerns by allowing an organization to specify which recipients can have access to its sensors and which recipients can have awareness of the existence of its sensors. Through this approach, an unauthorized recipient is able to discover who is an authorized recipient and could decide to contact an authorized recipient.

The description now turns to the four Monitors 151-154. Alarm Monitor 151 is coupled to the Sensor Interface 161 and invokes the Sensor Rules Engine 163 when the received sensor information includes an alarm indication from a verified sensor as found in the Sensor Database 171. Sensor Rules Engine 163 is sent an event from the Alarm Monitor 151 with the sensor information and the Organization Name and Organization Sensor Identifier values from the sensor record that corresponds to the received sensor alarm.

Sensor Data Monitor 152 is coupled to the Sensor Interface 161 and invokes the Sensor Rules Engine 163 whenever a sensor measurement data value is received from a verified sensor and the received data value is not within the normal range as configured for that sensor's Sensor Data Normal-Low Limit and Sensor Data Normal-High Limit values in the Sensor Database 171. The system supports sensor measurement values that may be spikey; Sensor Data Monitor 152 averages a set of received data values over a period of time using the Sensor Data-Averaging Interval value. An example where data averaging is appropriate is for a sensor that counts people entering or leaving a building. By averaging the people count over a time interval, the Sensor Data Normal-High Limit value can be lowered (i.e., made more sensitive) without falsely triggering an emergency condition when a group of people enter the building simultaneously. Sensor Rules Engine 163 is sent an event from the Sensor Data Monitor 152 with the sensor information and the Organization Name and Organization Sensor Identifier values from the sensor record.

Data Stream Monitor 153 is coupled to the Sensor Interface 161 and monitors for IP transport-layer UDP, TCP and SCTP data streams received via the Sensor Interface 161. When a sensor data stream is no longer being received (i.e., the sensor data stream stops), the Sensor Rules Engine 163 is sent an event from the Data Stream Monitor 153 with the sensor information and the Organization Name and Organization Sensor Identifier values from the sensor record that corresponds to the sensor whose data stream is no longer being received.

Heartbeat Monitor 154 is coupled to the Sensor Interface 161 invokes the Sensor Rules Engine 163 under two conditions: (1) whenever a heartbeat message is not received via the Sensor Interface 161 within a sensor's heartbeat interval as configured for that sensor in the Sensor Database 171; and (2) whenever a heartbeat message is received via the Sensor Interface 161 and the received heartbeat message indicates an unhealthy status (i.e., the received heartbeat status is not positive). With the first condition, the Heartbeat Monitor 154 detects when a sensor is no longer communicating with the Sensor Interface 161, possibly because the sensor has lost power, stopped working or there is a problem in the communication path between the sensor and the Sensor Interface 161. With the second condition, the Heartbeat Monitor 154 detects when a sensor is not fully operational, but the sensor is healthy enough to send a heartbeat message indicating a sensor problem. For example, a metal detector such as the type used at a courthouse or airport can indicate an operational problem by sending a heartbeat message containing a calibration error. Sensor Rules Engine 163 is sent an event from the Heartbeat Monitor 154 with the sensor information and the Organization Name and Organization Sensor Identifier values from the sensor record that corresponds to the sensor whose heartbeat has either been lost or has a negative health indication.

Figure 2:
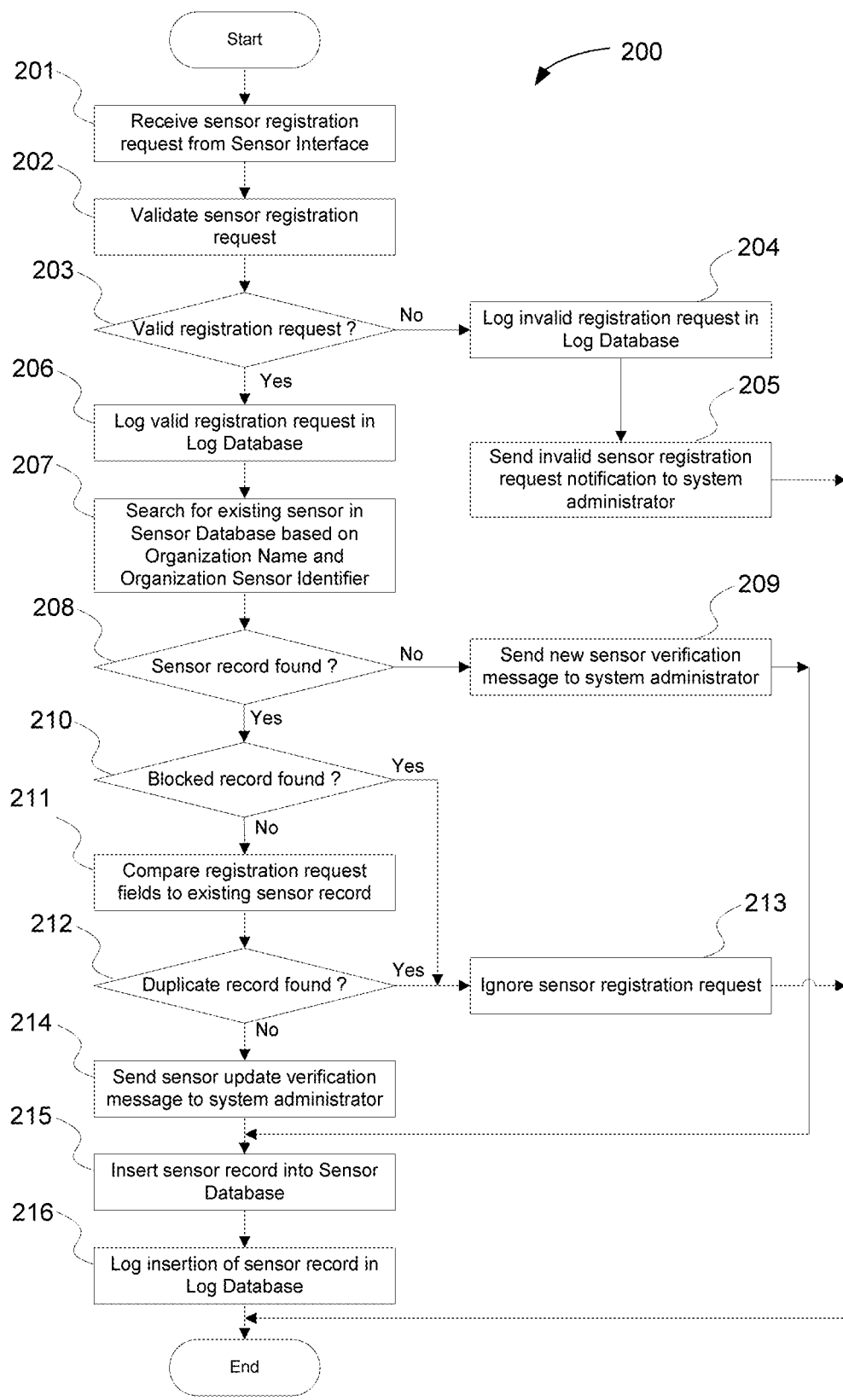
FIG. 2 is a flowchart illustrating the steps for effecting the Sensor Discovery Engine.

The process for adding sensor records to the Sensor Database 171 via the Sensor Discovery Engine 164 is shown in FIG. 2.

Turning to FIG. 2, flowchart 200 shows the Sensor Discovery Engine processing steps. The sensor discovery process starts at step 201 by receiving a sensor registration request from the Sensor Interface 161 in FIG. 1. At step 202, the sensor registration request is validated by parsing the sensor registration request for the following fields: (1) Organization Name; (2) Organization Contact; (3) Organization Sensor Identifier; (4) Federal Authorization Level; (5) State Authorization Level; (6) Local Authorization Level; (7) Sensor Technology; (8) Sensor Street Address; and (9) Sensor Location Description.

After step 202, processing continues to step 203 to determine whether the expected fields are present in the parsed sensor registration request, with processing either continuing to step 204 if the expected fields are not present or continuing to step 206 if the expected fields are present. If the expected fields are not present, at step 204 a log entry containing the invalid sensor registration request is added to the Log Database 172 in FIG. 1. Next, the system administrator is notified by e-mail of the invalid sensor registration request at step 205 via the System Manager 155 in FIG. 1 and then processing of the invalid sensor registration request ends. If the expected fields are present, at step 206 a log entry containing the valid sensor registration request is added to the Log Database 172 in FIG. 1. Processing continues to step 207, where the Sensor Discovery Engine searches for an existing record in the Sensor Database 171 in FIG. 1 using the parsed Organization Name and Organization Sensor Identifier.

After step 207, processing continues to step 208 to determine whether a matching sensor record is found, with processing either continuing to step 209 if no matching sensor record is found or continuing to step 210 if a matching sensor record is found. If a matching sensor record is not found, at step 209 the system administrator is notified by e-mail via the System Manager 155 in FIG. 1 that a new sensor record has been inserted into the Sensor Database 171 in FIG. 1 and that the newly inserted record needs to be verified. Processing then continues at step 215.

If a matching sensor record is found at step 208, at step 210 the Monitor Mode sensor field of the matching record is checked to determine if the sensor record is blocked. If the sensor record's Monitor Mode field is set to Blocked, processing proceeds to step 213 where the received sensor registration request is ignored and processing ends. If the sensor record is not blocked, processing continues to step 211 where the expected fields of the matched sensor record(s) and received sensor registration request are compared and then proceeds to step 212.

Step 212 determines whether a duplicate sensor record already exists in the Sensor Database 171 in FIG. 1. If a duplicate record is found, processing proceeds to step 213 where the received sensor registration request is ignored and processing ends. If a duplicate record is not found, the system administrator is notified by e-mail at step 214 via the System Manager 155 in FIG. 1 that an update to an existing sensor record has been received. The existing sensor record remains intact—it is deleted when the system administrator verifies the received sensor registration request via the web interface depicted in FIG. 6. Processing then continues to step 215 where the received sensor registration request is inserted into the Sensor Database 171 in FIG. 1 with the Current Timestamp field set to the current time and Monitor Mode set Disabled. Step 216 is the final processing step, where a log entry is added to the Log Database 172 in FIG. 1 to indicate that an unverified sensor record has been inserted into the Sensor Database 171 in FIG. 1 and that the system administrator has been notified to verify the inserted sensor record.

Returning to FIG. 1, the Emergency Condition Detection and Reporting System 150 receives and processes sensor information using the Sensor Rules Engine 163, with sensor rules stored in the Rules Database 170. To insert a sensor rule, the system administrator 140, via interface 141 and coupled to the System Manager 150, uses a web-based interface to manage the sensor rules. In alternative embodiments, sensor rules are managed through a database record import/export function and via a command line interface.

A sensor rule in the Rules Database 170 uniquely identifies each sensor by Organization Name and Organization Sensor Identifier and contains the following generic criteria data elements: (1) Sensor Heartbeat Error Notification; (2) Sensor Data Stream Loss Notification; (3) Sensor Data Abnormal Notification; and (4) Sensor Alarm Indication Notification. The sensor rule generic criteria data elements enable the Emergency Condition Detection and Reporting System 150 to process a wide variety of sensor types, including: pressure, temperature, optical, acoustic, chemical, biological, radiation, nuclear and video. The sensor rule generic criteria data elements support future compatibility for new sensor types; as long as the sensor information conforms to the generic criteria data elements, a new type of sensor can be supported by this invention.

To suppress detecting redundant events, a sensor rule contains four correlation fields, as follows: (1) Multiple Event Correlation-Logic Or; (2) Multiple Event Correlation-Logic And; (3) Multiple Event Correlation-Logic Sequence; and (4) Multiple Event Correlation-Time Interval. An exemplary record for a sensor rule in the Rules Database 170 is shown in the following table:

| Field Name | Value |
| --- | --- |
| Organization Name | Intrado Inc. |
| Organization Sensor Identifier | Cam_front_parking_lot |
| Multiple Event Correlation - Logic Or | Organization Name 1, Organization Sensor Identifier 1, Organization Name 9, Organization Sensor Identifier 9 |
| Multiple Event Correlation - Logic And | Organization Name 2, Organization Sensor Identifier 2, Organization Name 6, Organization Sensor Identifier 6 |
| Multiple Event Correlation - Logic Sequence | Organization Name 1, Organization Sensor Identifier 1, Organization Name 2, Organization Sensor Identifier 2 |
| Multiple Event Correlation - Time Interval | 5 minutes |
| Sensor Heartbeat Error Recipient Rule | Intrado_support_email |
| Sensor Data Stream Loss Recipient Rule | Intrado_support_email |
| Sensor Data Abnormal Recipient Rule | Longmont_CO_PSAP |
| Sensor Alarm Indication Recipient Rule | Longmont_CO_PSAP |

Figure 3:
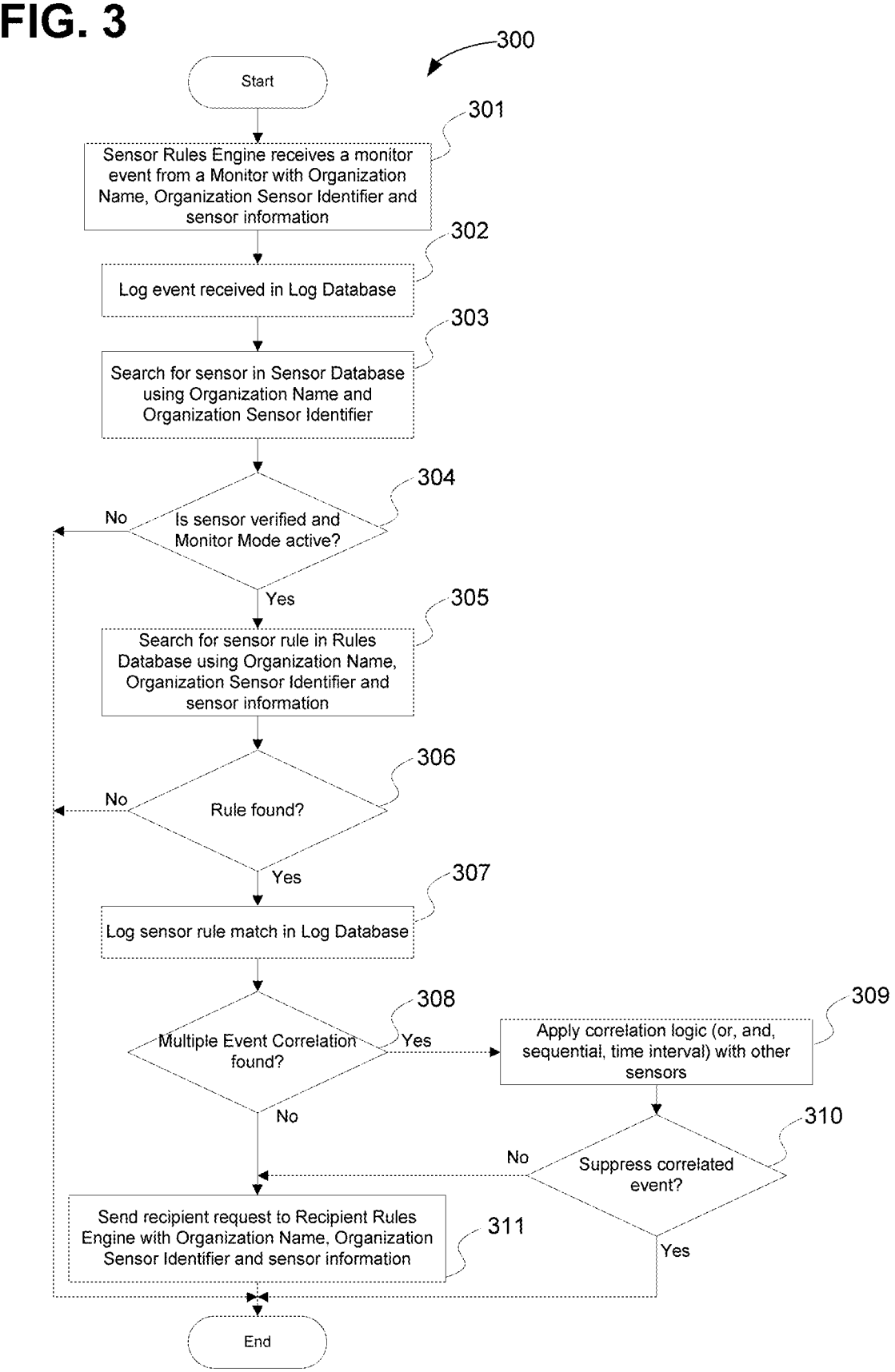
FIG. 3 contains flowchart 300 that illustrates the steps for effecting the Sensor Rules Engine.

Processing of sensor information by the Sensor Rules Engine 163 is shown in FIG. 3.

Turning to FIG. 3, flowchart 300 shows the Sensor Rules Engine processing steps. Processing step 301 starts by receiving an event from one of the Monitors 151-154 in FIG. 1. A received event includes sensor information along with the Organization Name and Organization Sensor Identifier sensor record fields. At step 302, the received event is logged with a timestamp in the Log Database 172 depicted in FIG. 1. At step 303, the event is validated by searching for the sensor record using the received Organization Name and Organization Sensor Identifier values in the Sensor Database 171 depicted in FIG. 1. If the event does not match a sensor record that is verified and has a Monitor Mode set to Active in step 304, processing ends. This verification step prevents sensors that have a Monitor Mode set to Blocked, Inactive or Test from generating an emergency condition. If the event matches a verified record and has Monitor Mode set to Active in step 304, processing continues to step 305 where the Rules Database 170 in FIG. 1 is searched for a matching sensor rule. Processing then proceeds to step 306. If the event does not match a sensor rule in step 306, processing ends. If the event matches a sensor rule in the Rules Database in step 306, processing continues to step 307 to log the matched sensor rule with a timestamp in the Log Database 172 depicted in FIG. 1. Following step 307, step 308 determines if the received event is correlated with previous events.

Multiple event correlation logic is configured using the following four sensor rule fields: (1) Multiple Event Correlation-Logic Or; (2) Multiple Event Correlation-Logic And; (3) Multiple Event Correlation-Logic Sequence; and (4) Multiple Event Correlation-Time Interval. If any of the Multiple Event Correlation logic fields at step 308 are non-null, processing continues to step 309 where the configured correlation logic is applied and then processing proceeds to step 310 where the monitor event may be suppressed based on the applied correlation logic from step 309. If all of the Multiple Event Correlation logic fields at step 308 are null, the correlation logic is bypassed and processing continues to step 311.

At step 309; monitor events associated with multiple sensors are correlated by querying the Log Database as depicted in FIG. 1, 172 for sensor rule log records, as follows:

Logic Or: Suppress sending a recipient request for this monitor event if any of the configured sensors have a sensor rule log record that has detected and reported an emergency condition within the past five minutes. An example usage of the Multiple Event Correlation-Logic Or correlation field is when there are primary and secondary sensors for redundancy—correlating both sensors would suppress sending duplicate recipient request.

Logic And: Suppress sending a recipient request for this monitor event if all of the configured sensors have sensor rule log records that have detected and reported an emergency condition within the past five minutes. An example usage of the Multiple Event Correlation-Logic And correlation field is to minimize the frequency of sending the same recipient request—by correlating a sensor with itself, the smallest frequency is the time interval specified in the Multiple Event Correlation-Time Interval field.

Logic Sequence: Suppress sending a recipient request for this monitor event if the configured sensors have sensor rule log records that have detected and reported an emergency condition in the configured sequence within the past five minutes. An example usage of the Multiple Event Correlation-Logic Sequence correlation field is when there is a perimeter motion sensor, an interior motion sensor and a secured room motion sensor—correlating these sensors would suppress sending duplicate recipient requests.

Time Interval: Process the correlation logic to span the configured time interval instead of the past five minutes.

In an alternative embodiment, correlation logic may be configured as a series of if-then-else logic expressions. For example, if sensor x=condition 1 and sensor y=condition 2 then suppress event, or if sensor x=condition 1 or sensor y=condition 2 then report event. It should be understood to one skilled in the art that correlating sensor events can be expressed using a variety of representations.

Based on the correlation logic executed in step 309 which determines whether the monitor event should be suppressed or should be reported to a recipient, at step 310 processing of the monitor event either continues to step 311 or ends.

Figure 4:
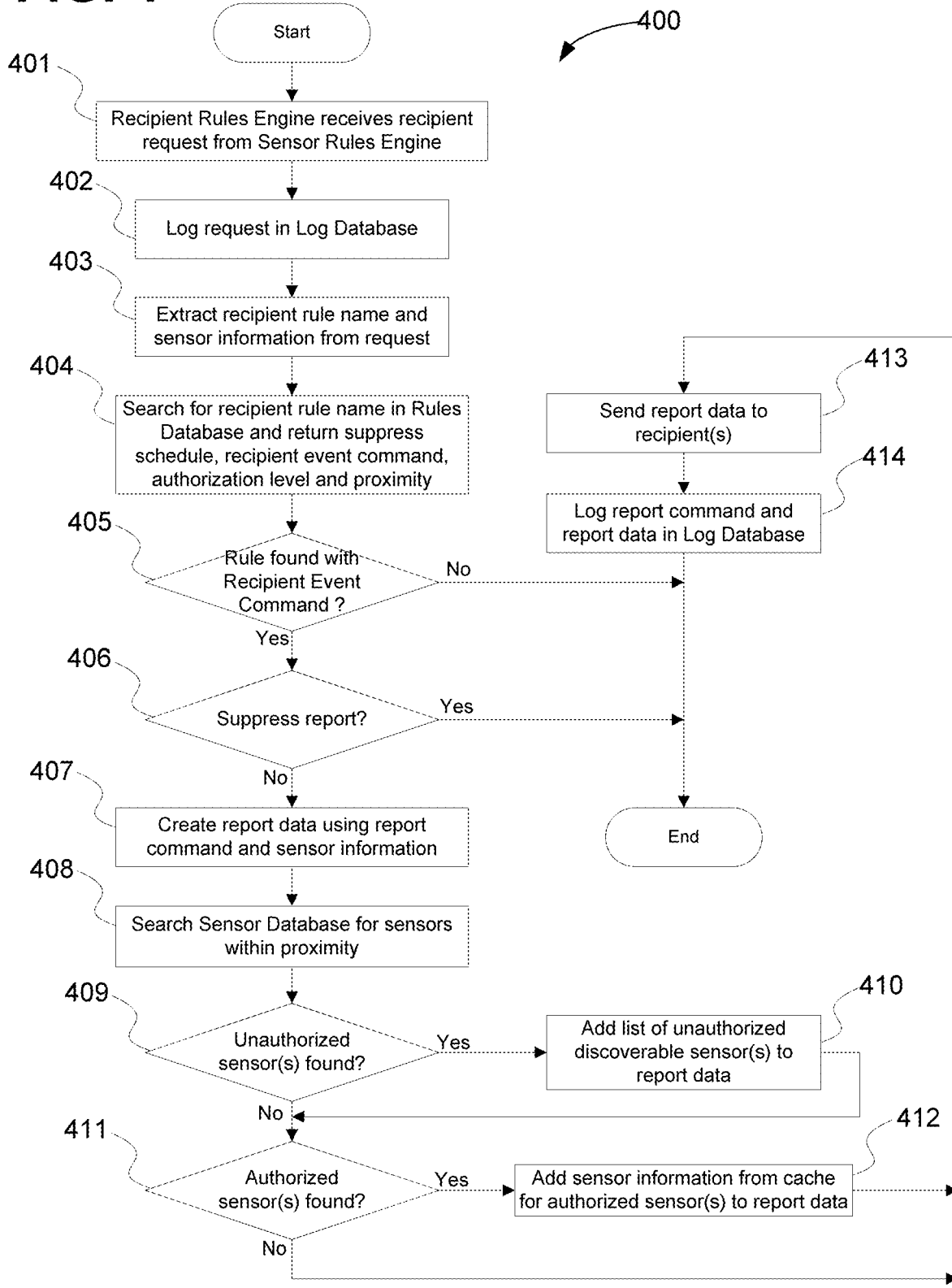
FIG. 4 is a flowchart illustrating the steps for reporting an emergency condition to a recipient by the Recipient Rules Engine.

Sensor Rule Engine processing is completed at step 311 by sending a recipient request to the Recipient Rules Engine containing the recipient rule name based on the matching criteria along with the sensor information. Emergency condition report processing by the Recipient Rules Engine 162 is shown in FIG. 4.

Returning to FIG. 1, the Recipient Rules Engine 162 reports detected emergency events to recipients via the Recipient Interface 160 using recipient rules contained in the Rules Database 170. Recipient Interface 160 provides a sensor information push-pull interface; in addition to sending reports of emergency conditions to recipients, the Recipient Interface 160 receives requests from recipients to provide sensor record data, current sensor information and historical sensor information.

Recipient rules in the Rules Database 170 are inserted, deleted and updated by the System Manager 150. To insert a recipient rule, the system administrator 140, via interface 141 and coupled to the System Manager 150, uses a web-based interface to enter the recipient rule values. In alternative embodiments, recipient rules are managed through a database record import/export function and via a command line interface. An exemplary record for a recipient rule in Rules Database 170 is shown in the following table:

| Field Name | Valu |
| --- | --- |
| Recipient Rule Name | Longmont_CO_PSAP |
| Recipient Name | Longmont, CO PSAP - national security emergency |
| Recipient Contact | Sheriff, (303) 441-3600 - 5600 Flatiron Parkway, Boulder, CO 80301 |
| Suppress Schedule | MTWTFSaSu:2000-0600 GMT |
| Recipient Event Command | https://192.168.1.55:9999 |
| Recipient Stream Command | rtsp://192.168.1.254:5555?stream=1 |
| Recipient Authorization Category | Federal |
| Recipient Authorization Level | 2 |
| Proximity | 1000 meters |
| Authorized Sensor Format | Location, Organization Name, Organization Sensor Identifier, Sensor Type |
| Unauthorized Sensor Format | Location, Organization Name, Sensor Type, Authorization Level |
| Verifier Username | Ssmith |
| Verifier Timestamp | 2014-03-27 11:29:08 GMT |

Figure 5:
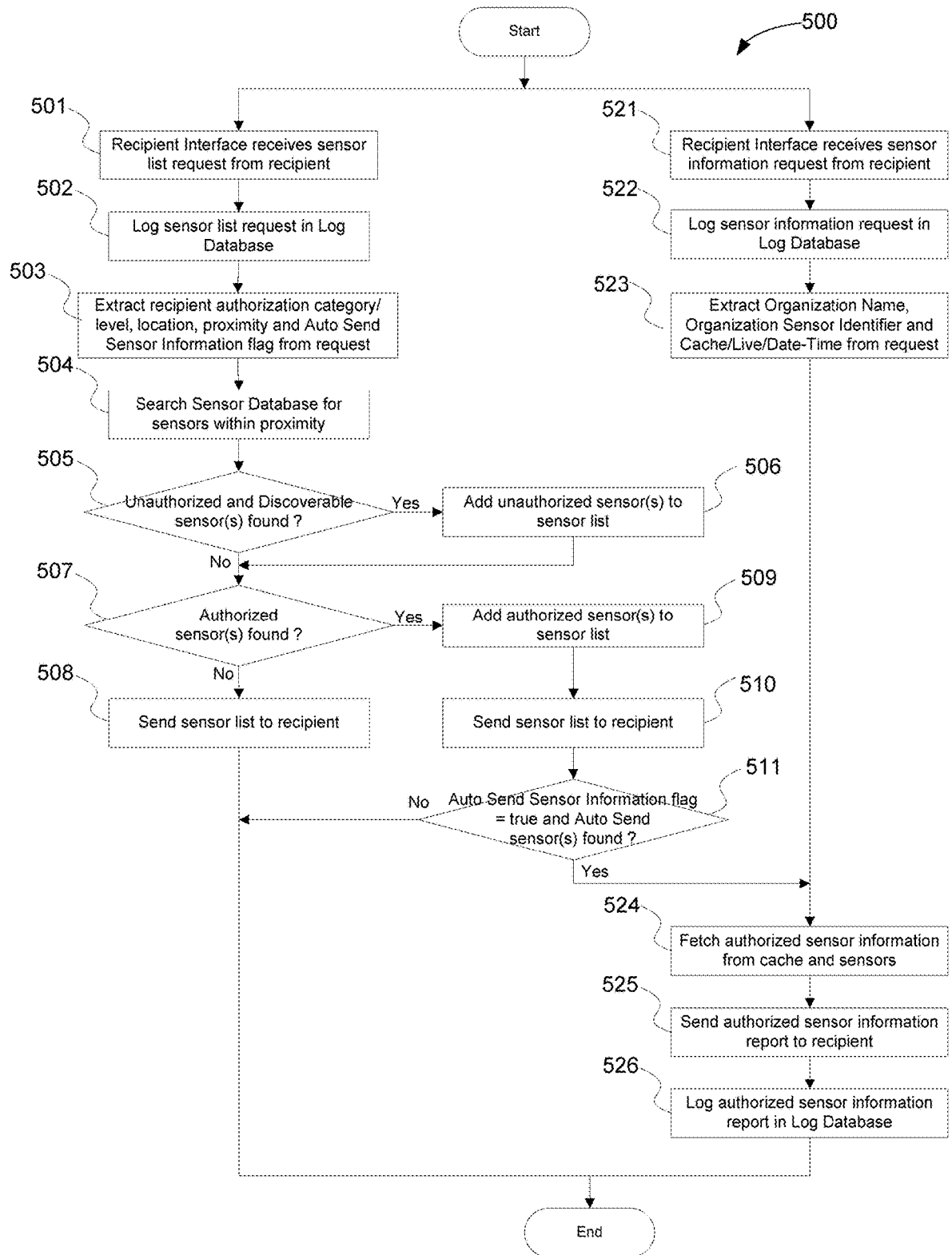
FIG. 5 is a flowchart illustrating the steps for processing a recipient request by the Recipient Rules Engine.

The processing steps for sending a report of an emergency condition to a recipient are shown in FIG. 4 while the processing steps for receiving a request for sensor record data and for sensor information from a recipient are shown in FIG. 5.

Turning to FIG. 4, flowchart 400 shows the Recipient Rules Engine processing steps for sending an emergency condition report to a recipient. Processing starts at step 401 by receiving a recipient request from the Sensor Rules Engine 162 in FIG. 1 when an emergency condition is detected. Processing continues to step 402, where a log entry with the recipient report request is added to the Log Database 172 in FIG. 1. In step 403, the contents of the recipient report request are extracted, including the recipient rule name and sensor information. Processing continues to step 404 where the extracted recipient rule name is used to query the Rules Database 170 in FIG. 1 to provide the suppress schedule, the recipient event command, the recipient authorization category/level and the proximity.

After step 404, processing continues to step 405 to determine if the Recipient Event Command is configured. If the Recipient Event Command is not configured, processing ends. If the Recipient Event Command is configured, processing proceeds to step 406 to determine if the report should be withheld from the recipient based on the configured suppress schedule. The suppress schedule indicates a recipient is intentionally not available for receiving an emergency condition report. For example, the suppress schedule is used by shift-based recipients to direct emergency condition reporting from off-duty recipients to on-duty recipients. In one alternative embodiment, the suppress schedule is dynamically controlled by a recipient. For example, the suppress schedule is controlled by a recipient sending an opt-in/opt-out text message and via a web-based interface. In a second alternative embodiment, the suppress schedule is dynamically controlled by an application which operates automatically using presence detection or a location-based geo-fence. For example, a mobile phone application may be used by emergency responders to reports location periodically so that emergency responders close to a detected emergency condition can be automatically notified of the nearby emergency condition. A second dynamic suppression application example is used for employees at a refinery—the access control system at the refinery dynamically updates the suppression schedule based on whether an employee has badged-in or badged-out. If step 406 determines the report should be suppressed, processing of the recipient report request ends. If step 406 determines the report should be sent to the recipient, either because the suppress schedule is not configurable or the current day/time is not within the configured suppress schedule, processing continues to step 407.

At step 407, the report data to be sent to the recipient is created. The report data includes the sensor information from the recipient report request. In an alternative embodiment, additional data from the Sensor Record such as the Organization Name, Sensor Importance values, etc. and data generated by the Alarm Monitor, Sensor Data Monitor, Data Stream Monitor and Heartbeat Monitor that invoked the Sensor Rule are included in the report data. In a second alternative embodiment, a sensor's data stream is automatically sent to the recipient when the following criteria are met: (1) the Sensor Data Stream field in the sensor record is configured; (2) the Authorized Recipient Auto Send field in the sensor record is set to True; and (3) the Recipient Data Stream Command in the recipient rule is configured. Processing then continues to step 408.

Every sensor has a location based on latitude and longitude. For a stationary sensor, the location may be statically configured in the Sensor Record. Alternatively, a sensor may be mobile in which case the sensor's location is provided dynamically via the Sensor Interface 161 in FIG. 1 with updates to the Sensor Database made when the sensor's location changes as depicted in flowchart 800 in FIG. 8. Using the proximity value obtained at step 404, at step 408 the Sensor Database is searched for sensors that are within the radial distance of the proximity value. In other embodiments proximate sensors are determined based on being within a polygon shape instead of a circle. Processing then continues to step 409 to determine if any sensors are found with an authorization level that is above the recipient's authorization level (i.e., the recipient is not authorized to receive the sensor's information).

Step 409 maintains sensor privacy and security as configured in a sensor record in the Sensor Database using the Federal Authorization Level, State Authorization Level and Local Authorization Level fields. The recipient's authorization level is configured in a recipient rule stored in the Rules Database using the Recipient Authorization Category and Recipient Authorization Level fields. If a search of the Sensor Database for proximate sensors returns at least one unauthorized sensor, processing proceeds to step 410 and then continues to step 411. If there are no unauthorized sensors within the proximate distance, processing proceeds directly to step 411. At step 410, a list of unauthorized sensors with sensor record field Unauthorized Recipient Discovery set to True is added to the report event. In an alternative embodiment, the list may be abbreviated to only provide a count of unauthorized sensors or the list may be expanded to include the location, Organization Name and authorization levels of unauthorized sensors. The Unauthorized Sensor Format field in the recipient rule associated with the recipient determines the contents of the unauthorized list.

Step 411 determines if there are any authorized sensors within a proximate distance of the sensor that was associated with an emergency condition. This step provides location-relevant sensor information to the recipient. If a search of the Sensor Database for proximate sensors returns at least one authorized sensor, processing proceeds to step 412 and then continues to step 413. If there are no authorized sensors within the proximate distance, processing proceeds directly to step 413. At step 412, sensor information for authorized sensors is added to the report data. The sensor information is preferably retrieved from a cache within the Sensor Interface 161 in FIG. 1. In an alternative embodiment, sensor information may be retrieved from the Alarm Monitor, Sensor Data Monitor, Data Stream Monitor or Heartbeat Monitor. In another alternative, sensor information may be retrieved from a sensor by searching the Sensor Database and using the Sensor Current Data Query field to query the authorized sensor via the Sensor Interface. Processing then continues to step 413.

At step 413, the emergency condition report data is sent to the recipient using the recipient event command identified in step 404. The report data includes the sensor information that was used by the Alarm Monitor, Sensor Data Monitor, Data Stream Monitor or Heartbeat Monitor to trigger the emergency condition. If there are unauthorized discoverable sensors within a proximate distance from the sensor that triggered the emergency condition, the report data includes a list of unauthorized discoverable sensors. If there are authorized sensors within a proximate distance from the sensor that triggered the emergency condition, the report data includes sensor information from the authorized sensors. In one alternative embodiment, instead of sending sensor information for authorized sensors, a list of authorized sensors is sent to the recipient. The list is either abbreviated to only provide a count of authorized sensors or to only include the location and Organization Name. The Authorized Sensor Format field in the recipient rule associated with the recipient determines the contents of the authorized list. In a second alternative, if the Sensor Data Stream field in the sensor record for an authorized sensor and the Recipient Data Stream Command in the recipient rule are both configured, the sensor's data stream is sent to the recipient using the Recipient Data Stream Command.

After the report data is sent to the recipient at step 413, the final processing step for requests from the Sensor Rules Engine 163 of FIG. 1 by the Recipient Rules Engine 162 in FIG. 1 is step 414, where a log record is added to the Log Database 172 in FIG. 1. The log record contains the report command and report data.

In addition to reporting emergency conditions to recipients, the Recipient Interface 160 in FIG. 1 receives sensor information requests from recipients. Taken together, these two functions provide a push-pull recipient interface—reports of an emergency condition are pushed to authorized recipients according to the processing steps depicted in FIG. 4 flowchart 400 and sensor information requests are pulled by recipients according to the processing steps depicted in FIG. 5 flowchart 500.

The push-pull Recipient Interface 160 in FIG. 1 provides a recipient with important contextual information so that a more effective response to a detected emergency condition can be made by the recipient. Consider the following simplified scenario: a fire sensor generates an alarm which triggers the Alarm Monitor to notify a recipient. The recipient report contains sensor information related to the fire sensor and sensor information from authorized sensors proximally located to the fire sensor, as well as a list of unauthorized discoverable sensors proximally located to the fire sensor. With the information contained in the report, a recipient can request additional sensor information using the pull function of the Recipient Interface 160 in FIG. 1. Processing sensor information pull requests by the Recipient Rules Engine 162 in FIG. 1 is described in flowchart 500 in FIG. 5.

Turning now to FIG. 5, flowchart 500 shows the Recipient Rules Engine steps for receiving and processing sensor requests from a recipient. There are two types of sensor requests: (1) a sensor list request (starting at step 501) which returns a list of sensors at a specified location and within a specified radial distance or polygon shape, and optionally sends sensor information for any authorized sensors depending on whether a sensor's Authorized Recipient Auto Send flag is true and if the sensor list request from the recipient set the Auto Send Sensor Information flag to true; and (2) a sensor information request (starting at step 521) which returns authorized sensor information.

Processing a sensor list request starts at step 501 by receiving a sensor list request from the Recipient Interface 160 in FIG. 1. Processing continues to step 502, where a log entry is added to the Log Database 172 in FIG. 1. In step 503, the contents of the sensor list request are extracted which includes the recipient authorization category, recipient authorization level, location, proximity and Auto Send Sensor Information flag. Processing continues to step 504 where the Sensor Database 171 in FIG. 1 is queried for sensors that are located within the specified proximity of the specified location extracted from the sensor list request.

After step 504, processing continues to step 505 to determine if the sensor database query returned any sensors that meet both of the following conditions: (1) the sensor's authorization category/level requirement exceeds the recipient's authorization category/level (i.e., the recipient is unauthorized); and (2) the Unauthorized Recipient Discovery field is set to true (i.e., the sensor is discoverable). If the sensor query returns at least one sensor that meets these two conditions, processing proceeds to step 506 where unauthorized/discoverable sensors are added to a sensor list and then processing continues to step 507. If no sensors meet these two conditions from step 505, processing proceeds directly to step 507.

At step 507, the results from the sensor database query at step 504 are checked to determine if any authorized sensors were found. If there are no authorized sensors found from the sensor query at step 504, processing proceeds to step 508 where the list containing any unauthorized/discoverable sensors is sent to the recipient, and then processing of the sensor list request ends. If there is at least one authorized sensor found at step 507, processing proceeds to step 509 where the authorized sensors are added to the sensor list. After step 509, processing proceeds to step 510 where the sensor list is sent to the recipient and then continues to step 511 to determine if authorized sensor information should be sent to the recipient.

The purpose of step 511 is to determine whether sensor information for an authorized sensor should be automatically sent to a recipient as part of the sensor list request or if the sensor information needs to be explicitly requested by the recipient in a sensor information request. The decision to automatically send sensor information after receiving a sensor list request from a recipient relies on the following two conditions: (1) if the Authorized Recipient Auto Send field for an authorized sensor record is true; and (2) if the Auto Send Sensor Information flag in the sensor list request is true. If both conditions for sending sensor information in step 511 are not true, processing for the sensor list request ends. If both conditions for sending sensor information are true, processing proceeds to step 524 using the Organization Name and Organization Sensor Identifier associated with each of the authorized sensors and with the Cache/Live/Date-Time parameter set to Cache (as if the recipient had sent a sensor information request for the authorized sensors using cached sensor information).

At step 524, sensor information for the authorized sensor (s) is compiled. The sensor information is based on the sensor information request Cache/Live/Date-Time parameter, as follows: (1) if the Cache/Live/Date-Time parameter is set to Cache, the sensor information is fetched from cache; (2) if the Cache/Live/Date-Time parameter is set to Live, the sensor information is based on the sensor's response to a data query using the Sensor Current Data Query command from the sensor record; and (3) if the Cache/Live/Date-Time parameter is set to Date-Time, the sensor information is based on the sensor's response to a data query using the Sensor Historical Data Query command from the sensor record and the specified Date-Time. After the sensor information is compiled, processing continues to step 525.

At step 525, sensor information for the authorized sensors and requested by a recipient is sent to the recipient. After the sensor information is sent to the recipient at step 525, the final processing step is step 526, where a log record is added to the Log Database 172 in FIG. 1. The log record contains the sensor information request sent from a recipient and any sensor information sent to the recipient.

Processing a sensor information request starts at step 521 by receiving a sensor information request from the Recipient Interface 160 in FIG. 1. Processing continues to step 522, where a log entry is added to the Log Database 172 in FIG. 1. In step 523, a set of Organization Names and Organization Sensor Identifiers are extracted from the sensor information request. These fields uniquely identify a sensor record in the Sensor Database. In addition to these fields, the sensor information request for each sensor includes a Cache/Live/Date-Time parameter to indicate the type of cached sensor information to be returned. Processing continues to step 524 as previously described where the following steps are executed: (1) sensor information is compiled; (2) the sensor information is sent to the recipient; and (3) a log entry is added to the Log Database.

Figure 6:
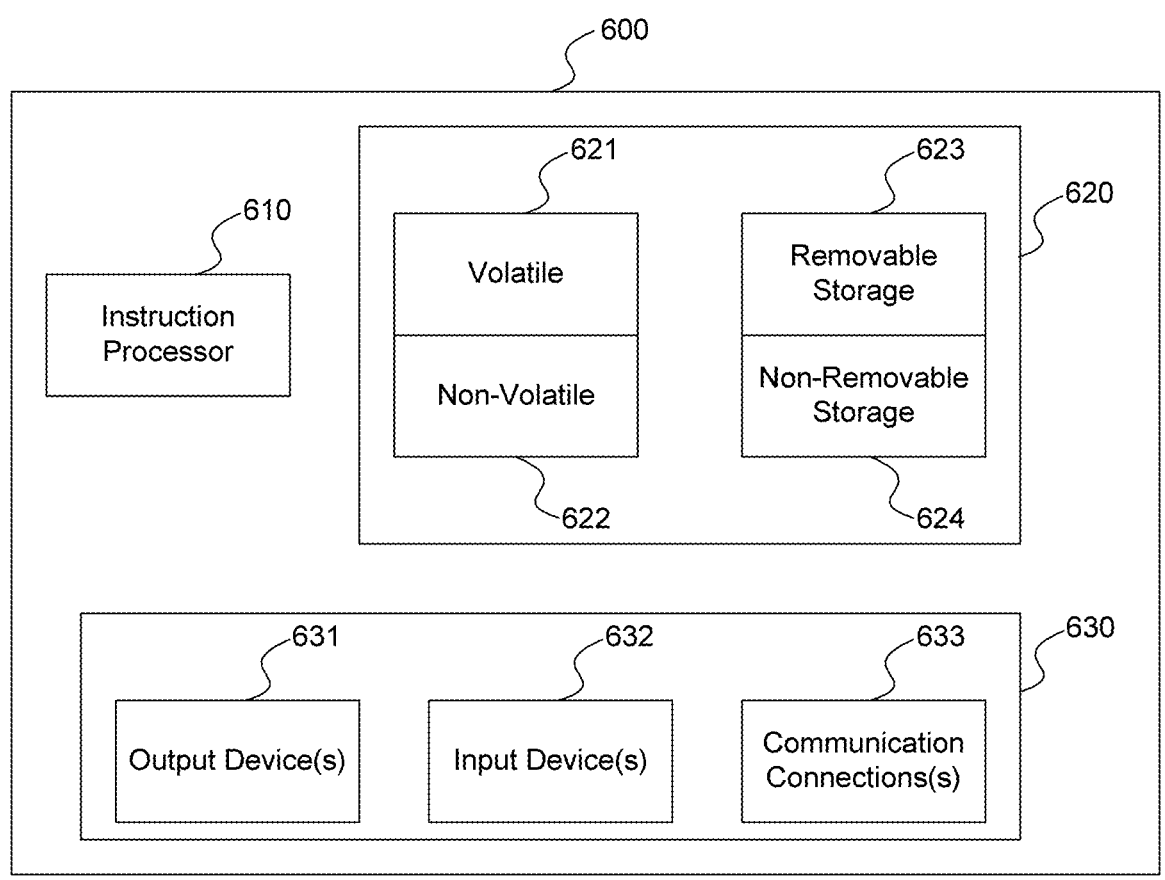
FIG. 6 is a block diagram of an example processor for effecting the Emergency Condition Detection and Reporting System.

Turning now to FIG. 6, example processor 600 is a block diagram of a processor in accordance with this invention. It is emphasized that the block diagram depicted in FIG. 6 is exemplary and not intended to imply a specific implementation. Thus, the processor 600 can be implemented in a single processor or multiple processors. Multiple processors can be distributed or centrally located. Multiple processors can communicate wirelessly, via hard wire, or any combination thereof.

The processor 600 comprises an instruction processor 610, a memory 620, and an input/output 630. The instruction processor unit 610, memory 620, and input/output 630 are coupled together (coupling not shown in FIG. 6) to allow communication among each other. The input/output 630 is capable of receiving sensor registration information, sensor data, sensor pull requests, system configuration commands, database queries and database record updates. The input/output 630 is also capable of sending emergency condition reports, sensor data and database record data.

The processor 600 is preferably implemented as a client processor and/or a server processor. In a basic configuration, the processor 600 includes at least one instruction processor 610 and memory 620. The memory 620 stores any information utilized in conjunction with sending, receiving, and/or processing sensor registration requests, sensor data streams, sensor data, sensor alarms, sensor status, sensor data sensor rules, recipient rules, recipient requests, log data, emergency condition reports and configuration data. Preferentially, the memory stores rules, sensor data and log data in a database. Depending upon the configuration and type of processor, the memory 620 can be volatile (such as RAM) 621, non-volatile (such as ROM, flash memory, etc.) 622, or a combination thereof. The processor 600 can have additional features/functionality. For example, the processor 600 can include additional storage (removable storage 623 and/or non-removable storage 624) including, but not limited to, magnetic or optical disks, tape, flash, smart cards or a combination thereof. Computer storage media, such as memory and storage elements 620, 621, 622, 623 and 624, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 600. Any such computer storage media may be part of the processor 600.

The processor 600 includes the communications connection(s) 633 that allow the processor 600 to communicate with other devices, for example with sensors 111-113, 121-123 and 131-133 via interfaces 114, 124 and 134 as illustrated in FIG. 1 or with recipients 189-196 via interfaces 181-188 as illustrated in FIG. 1. Communications connection(s) 633 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 600 also can have input device(s) 632 such as keyboard, keypad, mouse, pen, voice input device, touch input device, etc. Output device(s) 631 such as a display, speakers, printer, etc. also can be included.

We return to FIG. 1 to describe the System Manager 155 and sensor record verification by a system administrator 140 via interface 141. An unverified sensor record is inserted into the Sensor Database 171 by the Sensor Discovery Engine 164. In the preferred embodiment, System Manager 155 includes a web server to provide the Sensor Record Verification web page depicted in FIG. 7.

Figure 7:
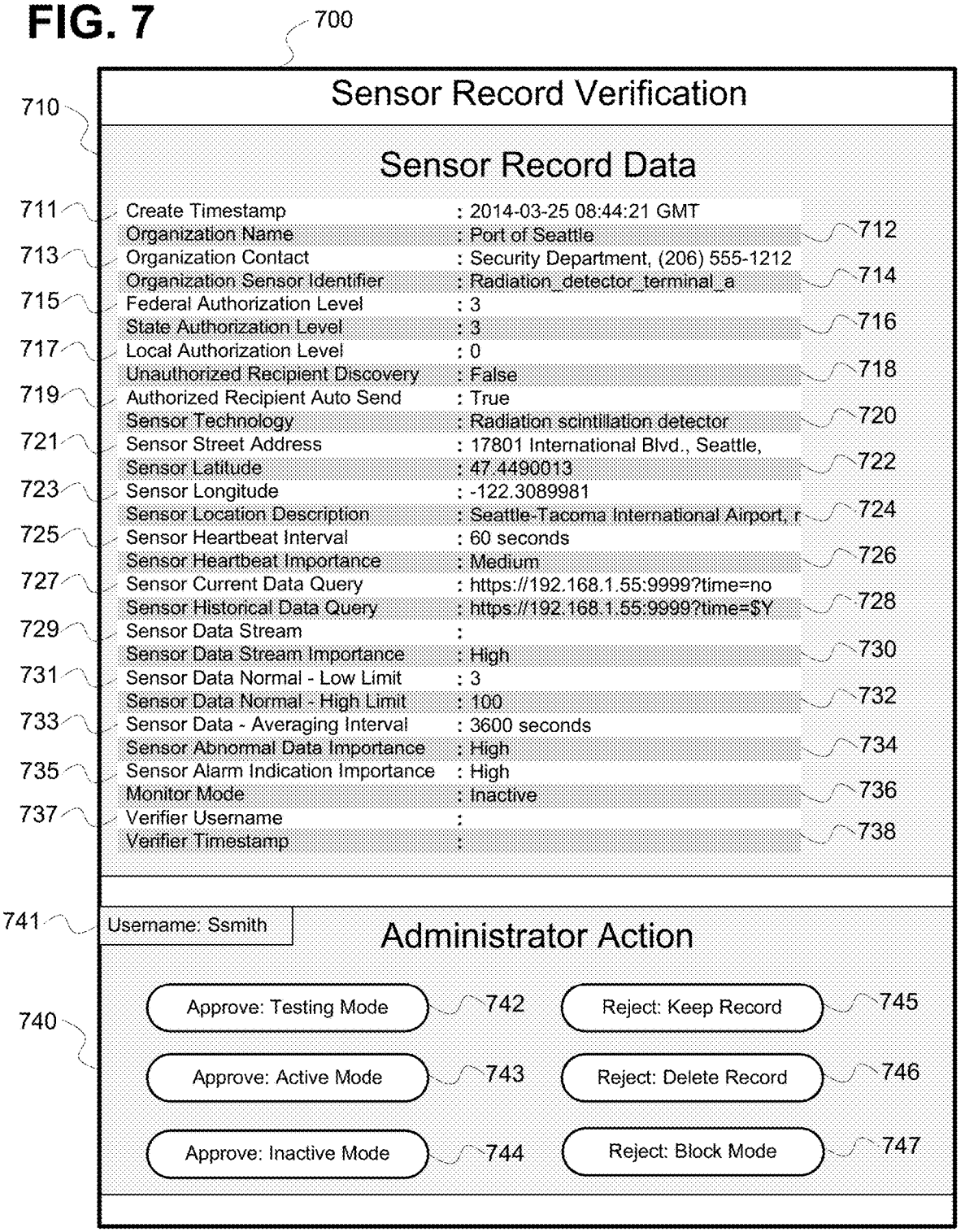
FIG. 7 is an exemplary diagram illustrating the system administrator user interface screen for verifying a new sensor record.

Turning to FIG. 7, the Sensor Record Verification web page 700 is divided into two sections: (1) section 710 presents the system administrator with the sensor record fields; and (2) section 740 presents the administrator with a selection of actions.

In section 710, rows 711-736 present all of the fields in one sensor record. In an alternative embodiment where the sensor record contains different fields, it should be understood to one skilled in the art that the rows in section 710 would reflect the different fields.

In section 740, element 741 shows the administrator's username. Elements 742-747 provide the administrator with a choice of actions buttons. The System Manager 155 processing in response to an administrator pressing an action button is as follows:

Action button 742 (Approve: Testing Mode)—Monitor Mode is set to Testing, Verifier Username set to the username 741 and Verifier Timestamp field set to the current time.

Action button 743 (Approve: Active Mode)—Monitor Mode is set to Active, Verifier Username set to the username 741 and Verifier Timestamp field set to the current time.

Action button 744 (Approve: Inactive Mode)—Monitor Mode is set to Inactive, Verifier Username set to the username 741 and Verifier Timestamp field set to the current time.

Action button 745 (Reject: Keep Record)—Monitor Mode is set to Inactive, Verifier Username set to null and Verifier Timestamp field set to the current time.

Action button 746 (Reject: Delete Record)—the sensor record is deleted.

Action button 747 (Reject: Block Record)—Monitor Mode is set to Blocked, Verifier Username set to the username 741 and Verifier Timestamp field set to the current time.

For one skilled in the art, it should be easily understood that the design and implementation of sensor record verification web page 700 is applicable to other system administrator web pages, including sensor record management, sensor rule management, recipient rule management, log record management and system settings. It should also be easily understood by one skilled in the art that a system administrator's access can be restricted. For example, a system administrator with username "Sally" may be restricted to sensor records with an Organization Name "General Hospital" while a second system administrator with username "Alice" may be restricted to recipient rules with Recipient Rule Name "NIH". By limiting system administrator access based on username, log records in the Log Database, sensor records in the Sensor Database, rules in the Rules Database and system settings are partitioned.

We return to FIG. 1 to describe an important role of third-party recipients 193. In the preferred embodiment, this invention connects to third-party recipients 193 via interface 185 to provide advanced monitoring. In this role, a third-party recipient could provide video analytics to detect a suspicious package or to detect a suspected terrorist using facial recognition. Through third-party recipient processing of sensor information, functionality of the four Monitors 151-154 is extended. To support this extensibility, a third-party recipient connects to Sensor Interface 161 where it is monitored by Alarm Monitor 151 and may be connected to other Monitors such as the Heartbeat Monitor 154. In this manner, a third-party recipient is both a sensor information recipient and a sensor information source.

While example embodiments of systems and methods for monitoring sensors belonging to multiple organizations as described herein have been described in connection with various communications devices and computing devices/processors, the underlying concepts can be applied to any communications or computing device, processor, or system capable of monitoring sensors belonging to multiple organizations. The various techniques described herein can be implemented in connection with hardware or software or, where appropriate, with a combination of both. Thus, the methods and apparatuses for monitoring sensors belonging to multiple organizations, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for monitoring sensors belonging to multiple organizations. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for monitoring sensors belonging to multiple organizations as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for monitoring sensors belonging to multiple organizations. When implemented on a general-purpose processor, the program code combines with the processor to provide a unique apparatus that operates to invoke the functionality of monitoring sensors belonging to multiple organizations. Additionally, any storage techniques used in connection with an emergency condition detection and report processing system can invariably be a combination of hardware and software.

While the systems and methods for monitoring sensors belonging to multiple organizations have been described in connection with the various embodiments of the various figures, it is to be understood that other similar embodiments can be used or modifications and additions can be made to the described embodiments for performing the same sensor monitoring functions without deviating from the described systems and methods. For example, one skilled in the art will recognize that a sensor monitoring system as described in the present application may apply to any environment, whether wired or wireless, and may be applied to any number of such devices connected via a communications network and interacting across the network. Therefore, a sensor monitoring system such as those described herein should not be limited to any single embodiment, but rather should be construed in breadth and scope in accordance with the appended claims.

The invention claimed is:

1. A method for reporting, in response to an event being detected, an existence of a plurality of sensors of monitoring systems belonging to respective multiple organizations to a recipient, the plurality of sensors being proximally located to a location of the event and configured to detect the event based on sensor information, the method comprising:
    receiving, by a reporting system, a request from the recipient, the request comprising, an authorization level of the recipient, the location of the event, and a proximity around the event in which to search for a sensor;
    searching, by the reporting system, a memory for the plurality of sensors that are located within the proximity to the location;
    creating, by the reporting system, a first list of sensors of the plurality of sensors by:
    identifying a sensor authorization level of a sensor of the plurality of sensors,
    comparing the sensor authorization level of said sensor to the recipient authorization level, and
    adding the sensor to the first list of sensors when the recipient authorization level is below the sensor authorization level;
    creating, by the reporting system, a second list of sensors of the plurality of sensors, comprising:
    identifying a sensor authorization level of a sensor of the plurality of sensors,
    comparing the sensor authorization level of said sensor to the recipient authorization level, and
    adding the sensor to the second list of sensors when the recipient authorization level is at least the same as the sensor authorization level; and
    sending, to the recipient, a report including the first list of sensors and the second list of sensors.

2. The method as recited in claim 1, wherein an area of the proximity is one or more of a radial distance or a polygonal shape.

3. The method as recited in claim 1, further comprising:
    identifying the first list of sensors as authorized sensors;
    identifying the second list of sensors as unauthorized sensors, and
    wherein the report further includes sensor information for the second list of sensors.

4. The method as recited in claim 3, wherein the sensor information is based on one or more of:
    sensor information fetched from a cache of the reporting system,
    a response of a sensor to a data query for current information, and
    a response of a sensor to a data query for historical information.

5. The method as recited in claim 1, further comprising:
    providing, for each sensor listed in the first list of sensors and the second list of sensors an Organization Name associated with each sensor and an identifier associated with each sensor.

6. The method as recited in claim 1, wherein each sensor of the plurality of sensors is one or more of:
    an air pressure sensor, a temperature sensor, a humidity sensor, a moisture sensor, a mechanical pressure sensor, an optical sensor, an acoustic wave sensor, a motion sensor, a chemical sensor, a gas sensor, a biological matter sensor, a metal sensor, an electromagnetic radiation sensor, a biometric parameter sensor, a visual pattern recognition sensor, a nuclear radiation sensor, and a visual stream sensor.

7. The method as recited in claim 1, wherein the sending the report to the recipient is performed by one or more of:
    IP, TCP, UDP, SCTP, HTTP, HTTPS, SIP, XML, CAP, RTP, RTSP, SMTP, MM4, and MM7.

8. A system for reporting, in response to an event being detected, an existence of a plurality of sensors of monitoring systems belonging to respective multiple organizations to a recipient, the plurality of sensors being proximally located to a location of the event and configured to detect the event based on sensor information, the system comprising: a processor; and
    a memory in communication with the processor and storing instructions that when executed by the processor cause the processor to:
    receive a request from the recipient, the request comprising an authorization level of the recipient, the location of the event, and a proximity around the event, in which to search for a sensor;
    search the memory for the plurality of sensors that are located within the proximity to the location;
    create a first list of sensors of the plurality of sensors by:
    identifying a sensor authorization level of a sensor of the plurality of sensors,
    comparing the sensor authorization level of said sensor to the recipient authorization level, and
    adding the sensor to the first list of sensors when the recipient authorization level is below the sensor authorization level;
    create a second list of sensors of the plurality of sensors by:
    identifying a sensor authorization level of a sensor of the plurality of sensors,
    comparing the sensor authorization level of said sensor to the recipient authorization level, and
    adding the sensor to the second list of sensors when the recipient authorization level is at least the same as the sensor authorization level; and
    sends, to the recipient, a report including the first list of sensors and the second list of sensors.

9. The system as recited in claim 8, wherein an area of the proximity is one or more of a radial distance or a polygonal shape.

10. The system as recited in claim 8, wherein the processor further is to:
    identify the first list of sensors as authorized sensors;
    identify the second list of sensors as unauthorized sensors, and
    wherein the report further includes sensor information for the said second list of sensors.

11. The system as recited h claim 10, wherein the sensor information is based on one or more of:
    sensor information fetched from a cache of the system,
    a response of a sensor to a data query for current information, and
    a response of a sensor to a data query for historical information.

12. The system as recited in claim 8, wherein the processor is further to:
provide, for each sensor listed in the first list of sensors and the second list of sensors, an Organization Name associated with each sensor and an identifier associated with each sensor.

13. The system as recited in claim 8, wherein each sensor of the plurality of sensors is one or more of:
an air pressure sensor, a temperature sensor, a humidity sensor, a moisture sensor, a mechanical pressure sensor, an optical sensor, an acoustic wave sensor, a motion sensor, a chemical sensor, a gas sensor, a biological matter sensor, a metal sensor, an electromagnetic radiation Sensor, a biometric parameter sensor, a visual pattern recognition sensor, a nuclear radiation sensor, and a visual stream sensor.

14. The system as recited h claim 8, wherein, when the processor is to send the report, the processor further is to send the report via one or more of:
IP, TCP, UDP, SCTP, HTTP, HTTPS, SIP, XML, CAP, RTP, RTSP, SMTP, SMPP, MM4, and MM7.

15. A non-transitory computer readable medium for reporting, in response to an event being detected, an existence of a plurality of sensors of monitoring systems belonging to respective multiple organizations to a recipient, the plurality of sensors being proximally located to a location of the event and configured to detect the event based on sensor information, the non-transitory computer readable medium configured to store instructions that when executed by a processor cause the processor to perform:
receiving a request from the recipient, the request comprising an authorization level of the recipient, the location of the event, and a proximity around the event in which to search for a sensor;
search the non-transitory computer readable medium for the plurality of sensors that are located within the proximity to the location;
creating a first list of sensors of the plurality of sensors by:
identifying a sensor authorization level of a sensor of the plurality of sensors,
comparing the sensor authorization level of said sensor to the recipient authorization level, and
adding the sensor to the first list of sensors when the recipient authorization level is below the sensor authorization level;
creating a second list of sensors of the plurality of sensors, comprising:
identifying a sensor authorization level of a sensor of the plurality of sensors,
comparing the sensor authorization level of said sensor to the recipient authorization level, and
adding the sensor to the second list of sensors when the recipient authorization level is at least the same as the sensor authorization level; and
sending to the recipient, a report including the first list of sensors and the second list of sensors.

16. The non-transitory computer readable medium as recited in claim 15, wherein an area of the proximity is one or more of a radial distance or a polygonal shape.

17. The non-transitory computer readable medium as recited in claim 15, further configured to store instruction that when executed by the processor cause the processor to perform:
identifying the first list of sensors as authorized sensors;
identifying the second list of sensors as unauthorized sensors, and
wherein the report further includes sensor information for the second list of sensors.

18. The non-transitory computer readable medium as recited in claim 17, wherein the sensor information is based on one or more of:
sensor information fetched from a cache in communication with the processor,
a response of a sensor to a data query for current information, and
a response of a sensor to a data query for historical information.

* * * * *

UNITED STATES PATENT AND TRADEMARK OFFICE
CERTIFICATE OF CORRECTION

PATENT NO. : 10,726,709 B2
APPLICATION NO. : 15/943836
DATED : July 28, 2020
INVENTOR(S) : Coyne et al.

It is certified that error appears in the above-identified patent and that said Letters Patent is hereby corrected as shown below:

In the Claims

In Column 21, Claim 5, Line 65, delete "sensors" and insert -- sensors, --, therefor.

In Column 22, Claim 7, Line 15, delete "SMTP," and insert -- SMTP, SMPP, --, therefor.

In Column 22, Claim 10, Line 60, delete "said second" and insert -- second --, therefor.

In Column 22, Claim 11, Line 61, delete "h claim" and insert -- in claim --, therefor.

In Column 23, Claim 13, Line 14, delete "Sensor," and insert -- sensor, --, therefor.

In Column 23, Claim 14, Line 17, delete "h claim" and insert -- in claim --, therefor.

In Column 24, Claim 17, Line 22, delete "store instruction" and insert -- store instructions --, therefor.

Signed and Sealed this
Twenty-second Day of July, 2025

Coke Morgan Stewart
*Acting Director of the United States Patent and Trademark Office*